United States Patent [19]

Atkinson et al.

[11] Patent Number: 5,031,193

[45] Date of Patent: Jul. 9, 1991

[54] METHOD AND APPARATUS FOR DIVERSITY RECEPTION OF TIME-DISPERSED SIGNALS

[75] Inventors: Frederick G. Atkinson, Winfeld; Gerald P. Labedz, Chicago; Duane C. Rabe, Rolling Meadows; Joseph J. Schuler, Roselle; Alton P. Werronen, Palatine, all of Ill.

[73] Assignee: Motorola, Inc., Schaumburg, Ill.

[21] Appl. No.: 435,650

[22] Filed: Nov. 13, 1989

[51] Int. Cl.[5] .................. H04B 7/005; H04B 7/08
[52] U.S. Cl. .................................. 375/13; 375/14; 375/96; 375/100; 455/138
[58] Field of Search .............. 375/13, 14, 96, 100, 375/102, 103, 106; 455/137, 138, 139

[56] References Cited

U.S. PATENT DOCUMENTS

| | | | |
|---|---|---|---|
| 3,633,107 | 1/1972 | Brady | 455/137 |
| 4,112,370 | 9/1978 | Monsen | 375/100 |
| 4,271,525 | 6/1981 | Watanabe | 375/14 |
| 4,281,411 | 7/1981 | Bonn et al. | 375/100 |
| 4,328,585 | 5/1982 | Monsen | 375/100 |
| 4,731,801 | 3/1988 | Henriksson | 375/100 |
| 4,733,402 | 3/1988 | Monsen | 375/100 |
| 4,829,543 | 5/1989 | Borth et al. | 375/83 |

OTHER PUBLICATIONS

G. Ungerboeck, "Adaptive Maximum Likelihood Receiver for Carrier-Modulated Data-Transmission Systems," IEEE Transactions on Communications, vol. COM-22, No. 5, May 1974, pp. 624-636.
G. D. Forney, "Maximum Likelihood Sequence Estimation of Digital Sequences in the Presence of Intersymbol Interference", IEEE Transactions on Information Theory, vol. IT-18, No. 3, May, 1972, pp. 363-377.
John G. Proakis, "Digital Communications", McGraw-Hill Book Company, 1983, pp. 357-386.

Primary Examiner—Benedict V. Safourek
Attorney, Agent, or Firm—Shawn B. Dempster; F. John Motsinger

[57] ABSTRACT

A method and appartus for diversity reception in a communication system wherein at least a dual branch receiver is provided with a stored replica of expected reference information that is correlated with the received time-dispersed signals to obtain an estimate of the transmission channel's impulse response as seen by each branch, and determine, among other things, phase error between the branch local oscillators and the time-dispersed signals. Matched filters are constructed which then coherently align the time-dispersed signals from each branch with that branch's local oscillator, also constituting the first part of the equalization. The diversity processing stage may perform bit by bit selection on the re-aligned signals, maximal ratio combining of the re-aligned signals, or equal gain combining of the re-aligned signals, following each by a sequence estimation which uses similarly selected or combined channel distortion compensation parameters to complete the equalization process on the new signal. In digital modulated carrier systems, providing expected reference information eliminates the neeed for carrier recovery feedback for each branch while performing part of the equalization process.

27 Claims, 3 Drawing Sheets

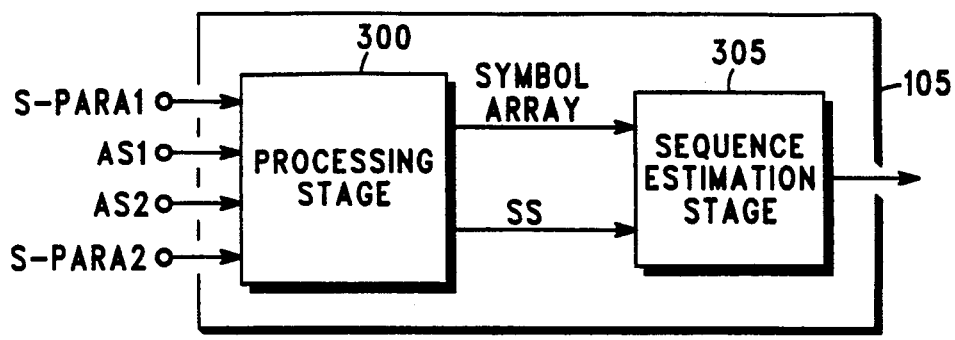
FIG.3
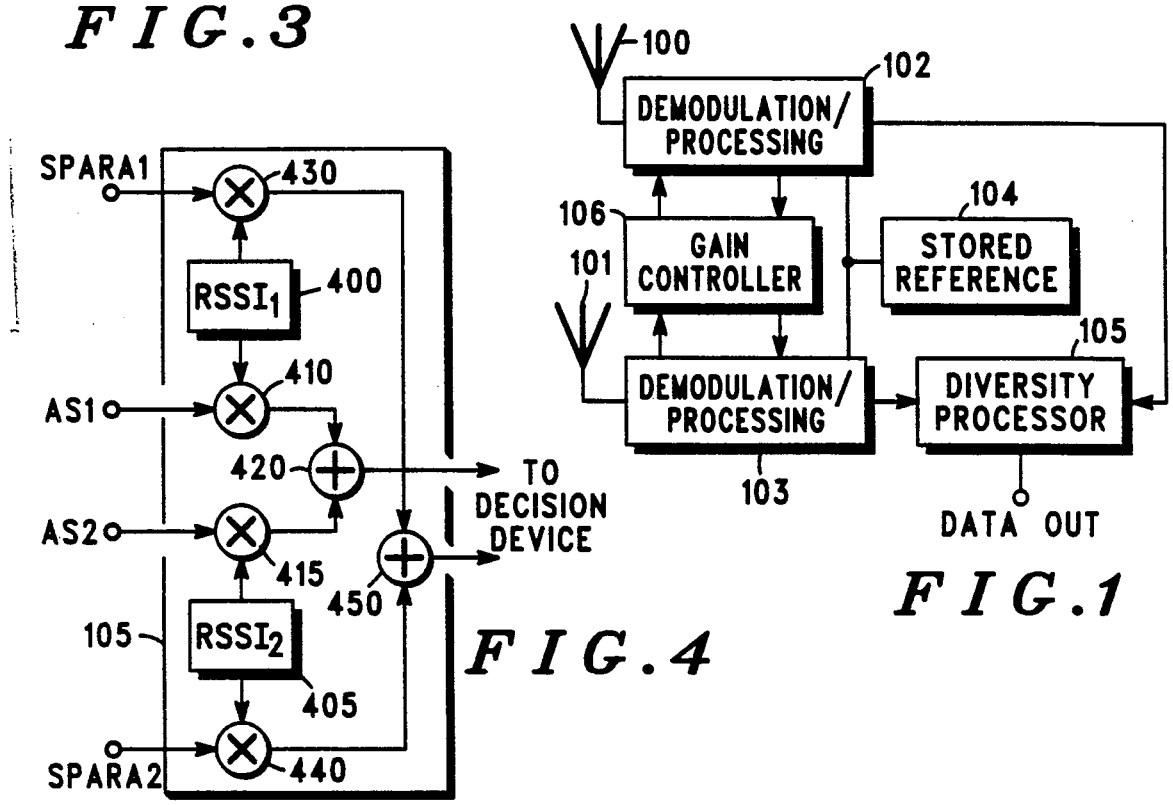
FIG.4
FIG.1
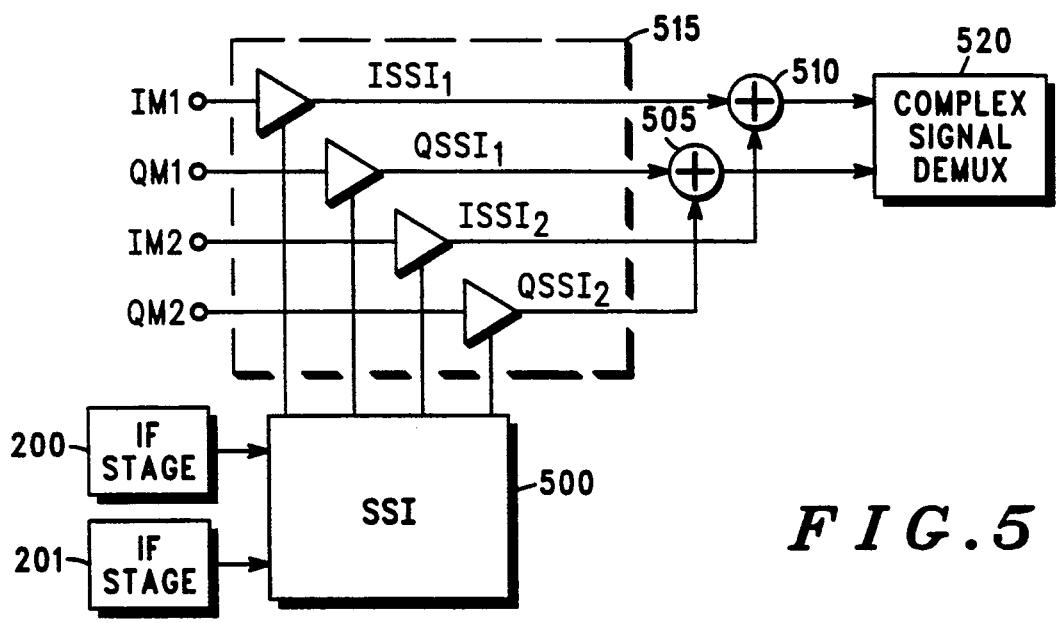
FIG.5

METHOD AND APPARATUS FOR DIVERSITY RECEPTION OF TIME-DISPERSED SIGNALS

TECHNICAL FIELD OF INVENTION

This invention relates generally to diversity receivers in communication systems and more specifically to receivers providing diversity reception for time-dispersed signals in communication systems.

BACKGROUND OF THE INVENTION

Enhanced signal detection in a time-dispersive medium generally requires a receiver to perform some type of echo signal equalization on the received time-dispersed signals to produce an output which has a better output than would result from allowing the echoes to interfere with one another. One such equalization technique used in a digital radio Time Division Multiple Access (TDMA) system is described in instant assignee's U.S. Pat. No. 4,829,543 entitled "Phase-Coherent TDMA Quadrature Receiver for Multipath Fading Channels" filed on behalf of Borth et al.

The Borth et al. invention describes a phase coherent method for demodulating a Quadrature Phase Shift Keyed (QPSK) radio signal that is subjected to multipath fading. Equalization is facilitated by correlating a stored training sequence, known to the receiver, against the incoming signal, and using the resulting correlation to remove the phase difference between the incoming signal and the receiver's local oscillator, effecting coherent detection. Equalization can then proceed.

Other techniques have been proposed for dealing with the intersymbol interference which can be generated in a transmitted signal by a time-dispersive transmission channel. Such receivers are described in "Adaptive Maximum Likelihood Receiver for Carrier-Modulated Data-Transmission Systems", authored by G. Ungerboeck, IEEE Transactions on Communications, Vol. COM-22, No. 5, May 1974, pp. 624-636, and "Maximum Likelihood Sequence Estimation of Digital Sequences in the Presence of Intersymbol Interference", authored by G. D. Forney, IEEE Transactions on Information Theory, Vol IT-18, No. 3, May, 1972, pp. 363-377.

However, in high data rate systems where transmission is through a severely delay-spread radio channel, single branch-single receiver equalization may fail to provide adequate time-dispersed distortion (multi-ray fading) correction. For example, practical implementations of equalizing receivers may have imperfect estimates of the critical error signal in the case of decision feedback equalization, or imperfect estimates of the transmission channel's impulse response in some other equalization schemes.

Therefore, diversity reception (the same signal received on multiple branches—which may be on different antennas, or on a single antenna at different times, or made in other ways, as is well known in the art) is typically necessary to sufficiently reduce the effect of multi-ray fading. One such receiver is described in U.S. Pat. No. 4,271,525 entitled, "Adaptive Diversity Receiver For Digital Communications". This patent describes an adaptive diversity receiver using an adaptive transversal filter for each receiver branch, followed by a decision feedback equalizer. The tap gains of the transversal filters are updated via feedback from the output of the equalizer, and other points in the receiver.

U.S. Pat. No. 4,731,801 entitled "Method For The Reception And Detection Of Digital Signals" discloses an improvement over U.S. Pat. No. 4,271,525 and other prior art by improving reception in highly dispersive transmission paths using coherent demodulation. This invention uses a technique wherein the output of the bit decision circuitry becomes a basis for calculating a correction signal. A reference carrier, resulting from summing the quadrature baseband signals and the in-phase baseband signals, is fed back to the local oscillator of quadrature demodulators which in turn compensates the phase difference between the received signals and the receiver's local oscillator to facilitate coherent demodulation.

However, inventions such as described in U.S. Pat. No. 4,271,525 require a set of adaptive transversal filters, one for each receiver branch, in addition to the equalization circuitry. Inventions such as U.S. Pat. No. 4,731,801 require complex circuitry to phase shift the signal in each diversity branch, and, more importantly, cannot arrive at the correct phase adjustments quickly enough to be useful in, for example, TDMA systems characterized by information which is received, and must be corrected, in short bursts separated by relatively long periods of time. During these long periods, signal phases in multi-ray fading channels can change radically relative to the receiver's local oscillator.

Accordingly, there exists a need for a reduced complexity receiver that performs diversity reception on continuous, or non-continuous, high speed digital signals and is capable of substantially reducing effects of both flat fading and multi-ray, dispersive fading due to time-dispersive transmission mediums.

SUMMARY OF THE INVENTION

These needs and others are substantially met by the method and apparatus for diversity reception of time-dispersed signals in communication systems disclosed below. The described method comprises correlating a first time-dispersed signal received on a first receiver branch against a known reference, resulting in a first correlation signal, and correlating a second time-dispersed signal received on at least a second receiver branch, against the known reference, resulting in a second correlation signal, then, using the correlation signals, re-aligning the first time dispersed signal and the second time dispersed signal to the known receiver reference signal and the branch's local oscillator, resulting in a first aligned signal and a second aligned signal, and generating a resulting signal in view of the first aligned signal and the second aligned signal.

The known reference signal is located in a stored look-up table (containing multiple synchronizing sequences as is appropriate in the case of either a Time Division Multiple Access (TDMA) system or a Frequency Domain Multiple Access (FDMA) system with embedded reference signals). The correlation determines, among other things, an estimate of the radio transmission channel's impulse response. After correlation is complete, a matched filter, usually a transversal filter having taps derived from the estimated channel impulse response, is used to perform a convolution on the time-dispersed received signals, thereby performing a phase equalization. The phase equalization substantially compensates for the phase difference between the received time-dispersed signal and the local oscillator in each receiver branch.

The resulting processed signal samples from each branch are chosen, along with additional channel impulse response-related parameters (s-parameters), in a sample selection technique and then all fed into a sequence estimator to complete the equalization process on the newly-created signal. Various signal-combining techniques such as the well-known maximal ratio combining or equal gain combining techniques may also serve as acceptable diversity techniques to combine the phase-compensated signals and channel impulse-related parameters useful for equalization.

BRIEF DESCRIPTION OF THE DRAWINGS

FIG. 1 is a block diagram generally depicting the invention.

FIG. 3 is a block diagram generally depicting the diversity processor using bit by bit selection diversity in accordance with the preferred embodiment of the invention.

FIG. 4 is a block diagram generally depicting the diversity processor employing a method of maximal ratio combing in accordance with the invention.

FIG. 5 is a block diagram generally depicting a second method of maximal ratio combing in accordance with the invention.

DESCRIPTION OF THE PREFERRED EMBODIMENT

Figure 2:
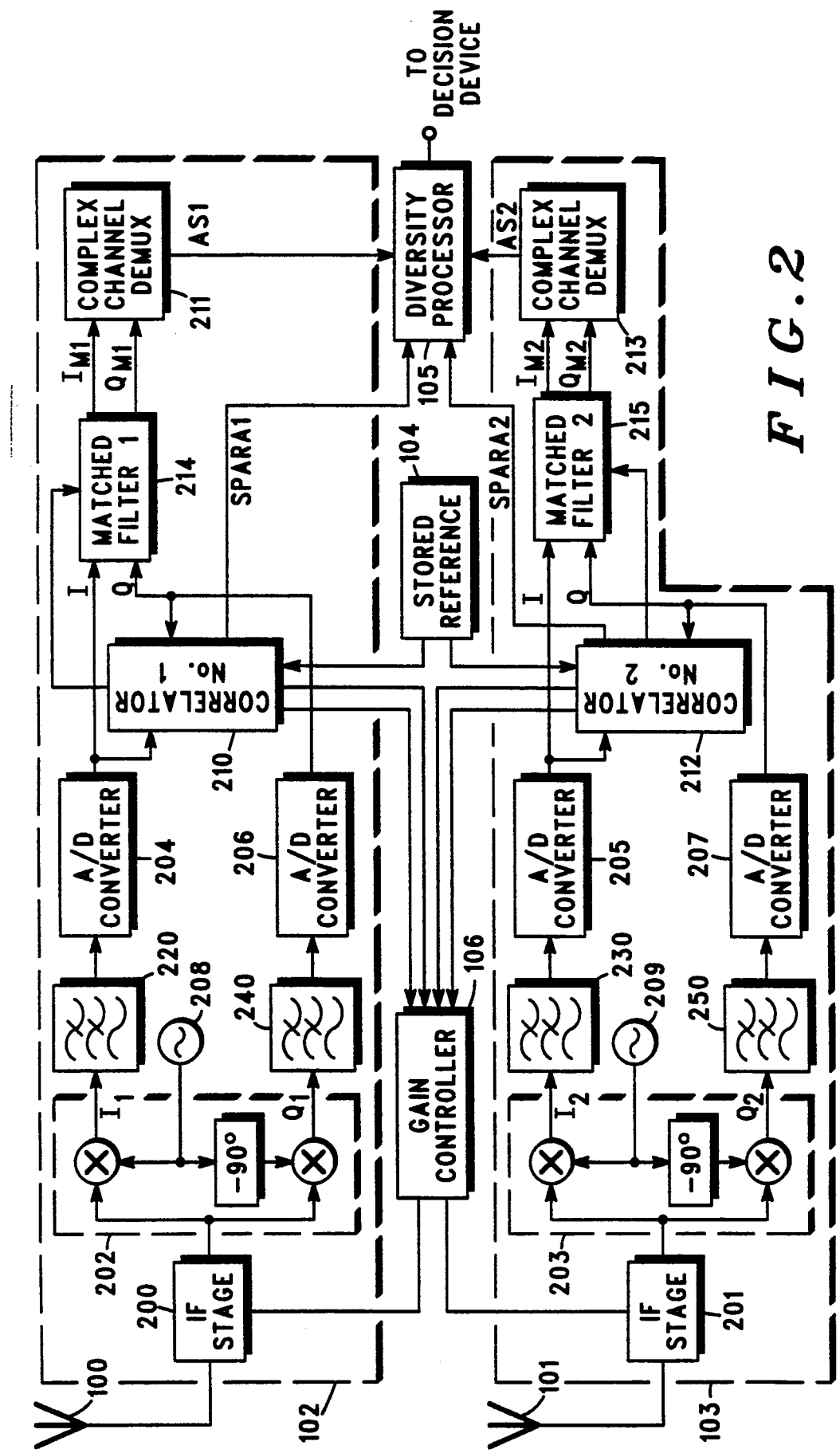
FIG. 2 is a more detailed block diagram of the invention as it applies to quadrature reception of digital signals.

FIG. 1 generally depicts the invention as adapted to an equalizing receiver described by G. Ungerboeck and referenced above. Quadrature Phase Shift Keying (QPSK) is employed. However, other digital multi-dimensional signaling, such as GMSK, may equivalently be employed. As shown, the invention comprises a first receiver branch (100) and at least a second receiver branch (101), each branch comprising a radio frequency demodulation stage and only part of the processing necessary to equalize a time-dispersed received signal (102 and 103). Although the description of the invention will refer to a receiver having two branches, the disclosed invention readily applies to receivers having N branches.

Both receiver branches are provided with a stored expected reference sequence (104) to allow post demodulation correlation between received time-dispersed signals and the reference sequence using known correlation techniques. The correlation information provides synchronization information, and parameters from which a channel matched filter can be made. The received time-dispersed signal is processed through this matched filter and the resulting phase re-aligned signal from each branch is then used by the diversity decision block (105) to generate an output signal. The correlation further provides information which can be used in an appropriate gain controller (106) to keep the received signal within a certain voltage range. No carrier recovery circuit (phase compensation feedback) is necessary to correct the modulated time-dispersed signals in relation to the local oscillator in each branch, provided that the transmission channel's impulse response, hence the correlation and hence the matched filter taps, do not change appreciably during the period of time during which the data to be processed is received. In either TDMA or FDMA systems, it may be necessary to adjust the receiver branch's local oscillator, or process the received data by some other means, if this is not the case.

A more detailed block diagram of the invention is shown in FIG. 2. The first diversity receiver branch (100) and the second diversity receiver branch (101) receive signals transmitted from the same point, but which have become time-dispersed, in different ways, in traveling from a transmitter to each branch of the receiver. These signals are processed by techniques well known in the art by being amplified and mixed in the intermediate frequency stages (200 and 201). Thereafter the signals are demodulated (transformed to baseband) into in-phase signals, $I_1$ and $I_2$, and quadrature phase signals $Q_1$ and $Q_2$ by quadrature demodulators (202 and 203) as understood in the art, whose injection comes from local oscillators (208 and 209). As already known in the art, the same local oscillator may be used for multiple branches.

Each of the in-phase signals and quadrature signals of each branch are passed through their respective low pass filters (220), (230), (240), (250) and sampled by analog to digital (A/D) converters (204), (205), (206), (207). Each of these signal samples are brought into correlators so that sampled $I_1$ is fed into correlator no. 1 (210), sampled $I_2$ is fed into correlator no. 2 (212), sampled $Q_1$ is also fed into correlator no. 1 (210), and sampled $Q_2$ is also fed into correlator no. 2 (212). Stored in the correlators' memory, or any other suitable location, is a known reference (104), such as a replica of an expected bit or pattern, that comprises amplitude and phase information substantially similar to an ideal signal that has not undergone time-dispersive fading.

The sampled signals are correlated to this stored reference information resulting in several metrics. These include an estimate of the impulse response of the transmission path (or a measure of the time-dispersed distortion of the environment), an estimate of the frequency/phase offsets relative to the known reference, and some measurement of signal strength. The signal strength measurements are then input to a gain controller (106), which in turn individually adjusts the gain of each branch in accordance with a predetermined gain equation suitable to the application. As is already known in the art, the gain of each IF stage (200 and 201) of each branch (100 and 101) may be simultaneously adjusted to produce the same gain on each branch.

The other metrics are used to construct a channel-matched filter for each branch, as well known in the art. After passing the signal samples through each branch's matched filter (214 and 215), the output signals have had the effects of time-dispersed distortion and phase error with each branch's local oscillator substantially removed.

For example, in a radio TDMA communication system utilizing a synchronization sequence in an assigned timeslot of a transmitted burst, a stored replica of a synchronization sequence expected by the receiver would be the data stored in the look-up table. The receiver correlates received signals from both branches (100 and 101) against the stored expected synchronization pattern to determine the time-dispersed profile models (channel impulse response) of each branch and then calculates the matched filter coefficients based on samples of the resulting correlation, or channel impulse response estimate.

The phase-aligned signals out of the matched filter (214) in the first branch (100) are represented by $I_{M1}$ and $Q_{M1}$ while the phase-aligned signals out of the matched filter (215) in the second branch (101) are represented by $I_{M2}$ and $Q_{M2}$. The diversity processor (105) then uses at least a portion of at least one of these aligned signals from both branches (and other pertinent information such as a measure of signal strength) to best determine the data of the originally transmitted signal.

The diversity processor (105) may use various techniques to effectuate an optimum representation of the original transmitted signal. FIG. 3 depicts the diversity processor using bit-by-bit selection diversity, wherein selected branch correlation parameters, called s-parameters, and selected samples of the aligned signals are fed to a sequence estimator which generates a representation of the original transmitted signal.

A more detailed explanation of s-parameter generation in receivers is given in the paper by Ungerboeck, referenced above, equation 17. Each branch derives its own s-parameters from the correlation, based on the convolution of the channel's estimated impulse response and the impulse response of its respective matched filter.

The aligned signal for the first branch (AS1) and the aligned signal for the second branch (AS2) are input into a processing stage (300). One sample per transmitted data symbol of each of the aligned signals is compared to its appropriate transmitted data symbol sample of the other branch. The absolute values of the samples are compared, and the actual sample with the greatest absolute value is put into a symbol array which will later be passed to a sequence estimation stage (305), which comprises a sequence estimator as known in the art. Although the greatest absolute value is the basis for selection in this embodiment, the lowest absolute value or any other suitable basis may also be used.

Furthermore, a counter for each branch is available to record the number of samples selected from each branch that are put into the symbol array. When the last symbol samples of the signal have been compared, the counters are compared to determine which branch provided the most samples to the symbol array. The s-parameters (SS) from the branch providing the most samples to the symbol array are sent to the sequence estimator in the form of an s-parameter array. The s-parameters provide the sequence estimator with processed intersymbol interference information. The sequence estimator then completes the equalization process.

Selection of the s-parameters may be eliminated, and a set of s-parameters chosen at random from one of the branches may be used in the receiver of Ungerboeck, but poorer performance would result. A receiver utilizing a sequence estimator not of the type described by Ungerboeck would not utilize s-parameters, but would still perform selection on a symbol sample basis following a matched filter, and perform an equivalent selection of any channel distortion-compensating parameter which may be utilized by the sequence estimator.

As stated, the combining of the signals occurs in the middle of the equalizer to facilitate diversity, inasmuch as the equalizer of this type in a single branch receiver may be considered to be the combination of the matched filter and the sequence estimator. The instant invention need only duplicate the matched filter function, but not the sequence estimator function in a diversity receiver.

FIG. 4 depicts another diversity processing technique, instead using combining analogous to maximal ratio combining of the aligned signals, whereby the weighting factor is determined by received signal strengths in accordance with a technique described in instant assignee's patent application Ser. No. 07/358,325, filed May 26, 1989, entitled "Rapid Received Signal Strength Indication" invented by Labedz et al. The weighting factor is best derived from a summation of the squares of the quadrature components of the energies at relative maxima of correlations between received echoes and a stored reference sequence. These correlated energy measurements are integrated to determine the energy present among the multiple time-dispersed echoes, and the resulting weighting factor is termed "received signal strength indicator". However, a sample of or integration of several samples of the received signal's envelope could also be used.

The received signal strength indicator for the first branch ($RSSI_1$) (400) is multiplied with the aligned signal from the first branch (AS1) using the multiplier (410) and forming a weighted aligned signal for the first branch. The received signal strength indicator for the second branch ($RSSI_2$) (405) is multiplied with the aligned signal from the second branch (AS2) using the multiplier (415) and forming a weighted aligned signal for the second branch. These weighted signals are then summed (420) resulting in a signal comprised of weighted signals from both branches.

The s-parameters, as described above, are processed in a similar fashion. The received signal strength indicator for the first branch ($RSSI_1$) (400) is multiplied with the s-parameters from the first branch (s-para1) using the multiplier (430) and forming a weighted set of s-parameters from the first branch. The received signal strength indicator for the second branch ($RSSI_2$) (405) is multiplied with the s-parameters from the second branch (s-para2) using the multiplier (440) and forming a weighted set of s-parameters from the second branch. These weighted s-parameters are then summed (450), resulting in a signal comprised of weighted set of s-parameters from both branches. This technique may also be applied where N receiving branches are used.

Again, combining of the s-parameters may be eliminated in the receiver of Ungerboeck, but poorer performance would result. A receiver utilizing a sequence estimator not of the type described by Ungerboeck would not utilize s-parameters, but would still perform combination on a symbol sample basis following a matched filter, and appropriate combination of whatever distortion-compensating parameters may be utilized by the sequence estimator.

In the case where weights from the signal's strength are not used, that is $RSSI_1$ (400) and $RSSI_2$ (415) are effectively set equal to 1, a technique analogous to equal gain combining results, and multipliers (410) and (415), and (430) and (440) are no longer necessary.

FIG. 5 depicts another method of diversity incorporating a technique analogous to maximal ratio combining of the aligned signals using a signal strength indicator (SSI) resulting from a determination of the signal strength measured at the intermediate frequency stages (200 and 201) of each branch. This embodiment combines the comples (in-phase and quadrature phase) aligned signals from each branch before they are passed through a complex signal de-multiplexer (520).

A signal strength weighting equation (500) determines the relative weight assigned each branch's aligned in-phase signal (IM1 and IM2) and each branch's aligned quadrature phase signal (QM1 and QM2). This equation weights IM1 and QM1 by $RSSI_1/(RSSI_1+RSSI_2)$ and weights IM2 and QM2 by $RSSI_2/(RSSI_1+RSSI_2)$. The weighted in-phase signals (ISSI$_1$ and ISSI$_2$) are summed (510) resulting in a combined in-phase signal for both branches, and the weighted quadrature signals (QM1 and QM2) are summed (505) resulting in a combined quadrature signal for both channels. Equal gain combining of the signals or bits therein may also serve as a suitable diversity decision technique. Such equal gain combining for diversity reception would again involve setting the RSSI$_1$ and RSSI$_2$ values equal to 1.

Although the preferred embodiment is suited for use in systems having high speed, noncontinuous signals such as TDMA systems having short burst signals, an alternative embodiment of the invention may be appropriate when receiving sufficiently long data streams where the transmission channel impulse response appreciably changes during the period of time during which the data to be processed is received.

Figure 6:
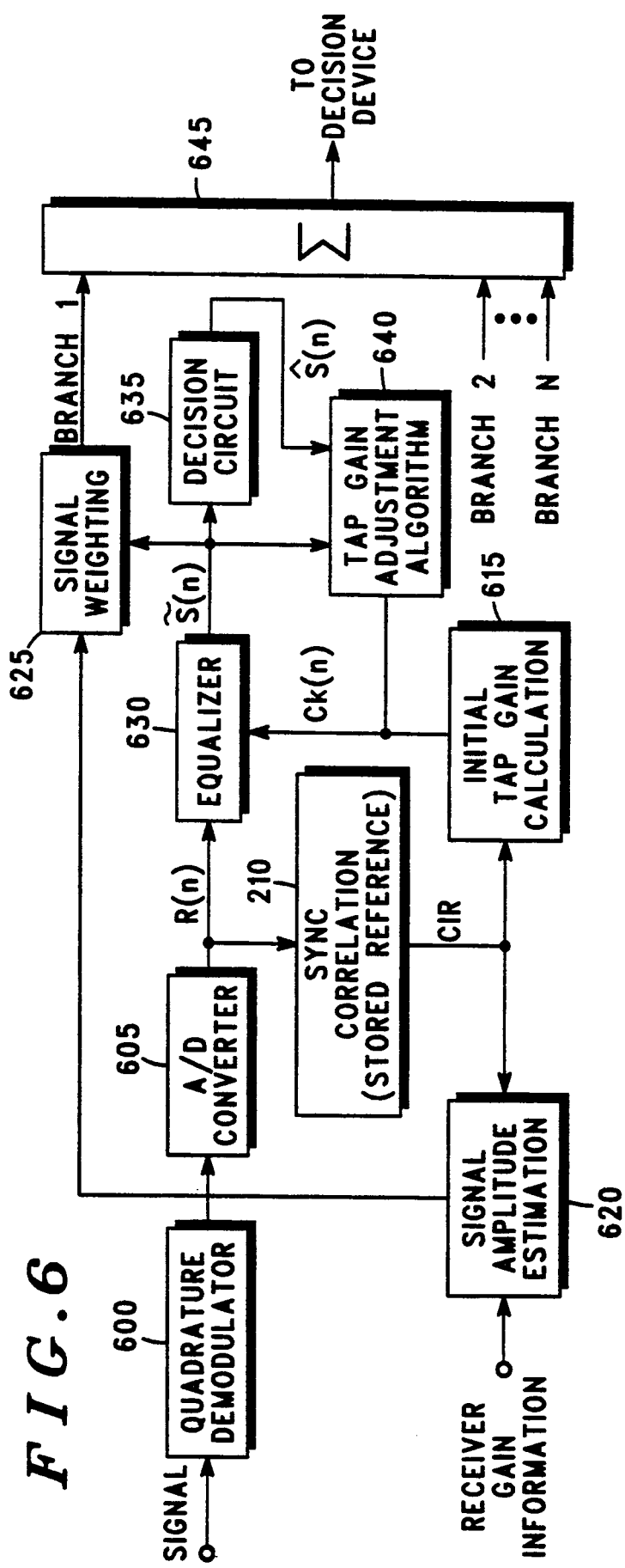
FIG. 6 is a block diagram generally depicting the invention using adaptive linear equalization.

FIG. 6 shows one branch of the present invention using an adaptive linear equalizer. In this embodiment, an initial correlation is performed using the known reference to estimate the channel impulse response (CIR) and initial equalizer tap gains ($C_k(0)$). Thereafter, tap gains of the equalizer are adjusted using typical adaptive linear equalization techniques (such as those described in *Digital Communications* by John G. Proakis, McGraw-Hill Book Company 1983, on pages 357-386) to continue re-aligning the received signal. Therefore, coherently re-aligning the received signal includes at least correlating the signal to the known reference (initially), then later adjusting the equalizer's tap gains in accordance with known adaptive linear equalization techniques.

As shown, the received signal is passed through a quadrature demodulator stage (600) and then sampled and digitized in the A/D converter stage (605) resulting in a complex signal (R(n)). This signal is correlated to the stored reference in the correlation stage (210) resulting in the channel impulse response (CIR) which is used in the initial equalizer tap gain ($C_k(n)$) calculation (615) and signal amplitude estimation (620). Signal amplitude estimation criteria contribute to the weighting factors determined in the signal weighting stage (625).

As indicated, R(n) is also input to the equalizer (630) wherein soft information (S(n)), as understood in the art, is generated. The soft information S(n) at the output of the equalizer is routed to a decision circuit (635) wherein a tentative decision S(n) is made for the purpose of updating the equalizer tap gains (640) as the received signal is processed. Once a suitable S(n) signal is generated, it is weighted (625) and output to a summing junction (645), which combines some or all of both branch (in the case of a dual branch receiver) output signals prior to the final bit decision. Each branch output signal may be appropriately weighted to meet either equal-gain or max-ratio combining criteria or may be combined using bit by bit selection as previously disclosed herein.

As appreciated by those skilled in the art, the present invention may also be applied to receivers utilizing decision feedback equalizers or any appropriate non-linear equalizer. For example, S(n) may be soft information derived from the decision feedback equalizer prior to the decision circuit. Also, symbol sample selection, or combining, may occur after a feed-forward filter (as understood in the art) for each diversity branch, or any other appropriate point within the equalizer block itself.

What we claim is:

1. A receiver for providing diversity reception comprised of:
   (a) correlating means for generating:
      (i) a first correlation signal by digitally correlating a first received sampled time-dispersed signal against a known reference sequence; and
      (ii) a second correlation signal by digitally correlating a second received sampled time-dispersed signal against the known reference sequence;
   (b) re-aligning means, operably coupled to the correlating means, for generating:
      (i) a first aligned signal by coherently re-aligning the first time-dispersed signal to the reference sequence by using at least the first correlation signal; and
      (ii) a second aligned signal by coherently re-aligning the second time-dispersed signal to the reference sequence by using at least the second correlation signal; and
   (c) signal generation means, operably coupled to re-aligning means, for generating a digital output signal derived from the first and second aligned signals.

2. The receiver of claim 1 wherein the correlating means comprises means for generating:
   (a) the first correlation signal by determining a channel impulse response, using the known reference sequence, for a receiver branch through which the first received time-dispersed signal was received; and
   (b) the second correlation signal by determining a channel impulse response using the known reference sequence for a receiver branch through which the second received time-dispersed signal was received.

3. The receiver of claim 1 wherein the re-aligning means comprises a linear equalizer.

4. The receiver of claim 1 wherein the re-aligning means comprises a decision feedback equalizer.

5. The receiver of claim 1 wherein the signal generation means generates the digital output signal with bit by bit selection diversity signal combining techniques.

6. The receiver of claim 1 wherein the signal generation means generates the digital output signal with maximal ratio signal combining techniques.

7. The receiver of claim 6 wherein the maximal ratio signal combining techniques comprise determining a weighting factor from a Received Signal Strength Indicator, the Received Signal Strength Indicator being determined from processed channel sounding techniques using a time-dispersal function to determine energy levels of received time-dispersed signals.

8. The receiver of claim 6 wherein the maximal ratio signal combining techniques comprise generating a weighting factor based on a measurement of signal strength measured at an intermediate frequency stage.

9. The receiver of claim 1 wherein the signal generation means generates the digital output signal by summing at least a portion of the first aligned signal with at least a portion of the second aligned signal to form a coherent equal gain output signal.

10. The receiver of claim 1 wherein the re-aligning means comprises a channel matched filter.

11. The receiver of claim 1 wherein the correlating means further generates:
   (a) first s-parameters associated with the first received time-dispersed signal, the first s-parameters being derived from an estimated channel impulse response of a first receiver branch through which the first received time-dispersed signal was received and a matched filter impulse response of the first receiver branch; and
   (b) second s-parameters associated with the second received time-dispersed signal, the second s-parameters being derived from an estimated channel impulse response of a second receiver branch through which the second received time-dispersed signal was received and a matched filter impulse response of the second receiver branch.

12. The receiver of claim 11 wherein the signal generation means comprises:
   (a) means for generating an array of symbol samples through bit by bit selection between symbol samples in the first aligned signal and symbol samples in the second aligned signal;
   (b) means for determining which of the first and second aligned signal contributed an appropriate number of the selected symbol samples to the symbol sample array; and
   (c) means for providing a sequence estimator with:
      (i) the symbol sample array: and
      (ii) the s-parameters associated with the received time-dispersed signal whose aligned signal contributed the appropriate number of selected symbol samples.

13. The receiver of claim 11 wherein the signal generation means comprises:
   (a) sampling means for sampling signal symbols from each of the aligned signals:
   (b) summing means, operably coupled with sampling means, for generating a combined symbol sample array by summing the samples of symbols from each aligned signal; and for generating a combined s-parameter array by summing s-parameters associated with each received time-dispersed signal; and
   (c) means, operably coupled with the summing means, for providing a sequence estimator with:
      (i) the combined symbol sample array: and
      (ii) the combined s-parameter array.

14. A receiver for providing diversity reception comprised of:
   (a) correlating means for generating:
      (i) a first correlation signal by digitally correlating a first received digital time-dispersed signal against a known reference sequence;
      (ii) a second correlation signal by digitally correlating a second received digital time-dispersed signal against the known reference sequence;
      (iii) first s-parameters associated with the first received time-dispersed signal, the first s-parameters being derived from an estimated channel impulse response from a first receiver branch through which the first received digital time-dispersed signal was received and a matched filter impulse response from the first receiver branch: and
      (iv) second s-parameters associated with the second received time-dispersed signal, the second s-parameters being derived from an estimated channel impulse response from a second receiver branch through which the second received digital time-dispersed signal was received and a matched filter impulse response from the second receiver branch:
   (b) re-aligning means, operably coupled to the correlating means, for generating:
      (i) a first aligned symbol sequence by coherently re-aligning the first received signal to the reference sequence by using at least the first correlation signal; and
      (ii) a second aligned symbol sequence by coherently re-aligning the second received signal to the reference sequence by using at least the second correlation signal; and
   (c) signal generation means, operably coupled to re-aligning means, for generating a digital output signal derived from the first and second aligned symbol sequences and the first and second s-parameters.

15. A method for providing diversity reception comprising:
   (a) generating a first correlation signal by digitally correlating a first received sampled time-dispersed signal against a known reference sequence;
   (b) generating a second correlation signal by digitally correlating a second received sampled time-dispersed signal against the known reference sequence;
   (c) generating a first aligned signal by coherently re-aligning the time-dispersed signal to the reference sequence by using at least the first correlation signal;
   (d) generating a second aligned signal by coherently re-aligning the second time-dispersed signal to the reference sequence by using at least the second correlation signal; and
   (e) generating a digital output signal derived from the first aligned signal and the second aligned signal.

16. The method of claim 15 wherein:
   (a) generating the first correlation signal comprises determining a channel impulse response, using the known reference sequence, from a receiver branch through which the first received time-dispersed signal was received; and
   (b) generating the second correlation signal comprises determining a channel impulse response, using the known reference sequence, from a receiver branch through which the second received time-dispersed signal was received.

17. The method of claim 15 wherein generating the digital output signal comprises utilizing bit by bit selection diversity signal combining techniques.

18. The method of claim 15 wherein generating the digital output signal comprises utilizing maximal ratio signal combining techniques.

19. The method of claim 18 wherein utilizing maximal ratio signal combining techniques comprise determining a weighting factor from a Received Signal Strength Indication, the Received Signal Strength Indication being determined from digital processed channel sounding techniques using a time-dispersal function to determine energy levels of received time-dispersed signals.

20. The method of claim 18 wherein utilizing maximal ratio signal combining techniques comprise generating a weighting factor based on a measurement of signal strength measured at an intermediate frequency stage.

21. The method of claim 15 wherein generating the digital output signal comprises summing at least a portion of the first aligned signal with at least a portion of the second aligned signal to form an equal gain output signal.

22. The method of claim 15 wherein generating first and second aligned signals comprises passing the first and second received time-dispersed signals through a matched filter.

23. The method of claim 15 further comprises the steps of:
    (a) generating first s-parameters derived from a channel impulse response of a first receiver branch through which the first received time-dispersed signal was received and a matched filter impulse response of the first receiver branch; and
    (b) generating second s-parameters derived from a channel impulse response of a second receiver branch through which the second received time-dispersed signal was received and a matched filter impulse response of the second receiver branch.

24. The method of claim 23 wherein generating the digital output signal comprises:
    (a) generating an array of symbol samples through bit by bit selection between symbol samples in the first aligned signal and symbol samples in the second aligned signal;
    (d) determining which of the first and second aligned signals contributed an appropriate number of the selected symbol samples to the symbol sample array; and
    (c) providing a sequence estimator with:
        (i) the symbol sample array: and
        (ii) the s-parameters associated with the receiver branch whose aligned signal which was derived from a time-dispersed signal received by the receiver branch contributed the appropriate number of selected symbol samples.

25. The method of claim 23 wherein generating the digital output signal comprises:
    (a) sampling signal symbols from each of the aligned signals;
    (b) forming a combined symbol sample array by summing the samples of symbols from each aligned signal;
    (c) forming a combined s-parameter array by summing the s-parameters associated with each received time-dispersed; and
    (d) providing a sequence estimator with:
        (i) the combined symbol sample array: and
        (ii) the combined s-parameter array.

26. A method for providing diversity reception comprising:
    (a) generating a first correlation signal by digitally correlating a first received time-dispersed digital signal against a stored known reference sequence;
    (b) generating a second correlation signal by digitally correlating a second received time-dispersed digital signal against the stored known reference sequence;
    (c) generating first s-parameters derived from a channel impulse response of a first receiver branch through which the first received time-dispersed signal was received and a matched filter impulse response of the first receiver branch;
    (d) generating second s-parameters derived from a channel impulse response of a second receiver branch through which the second received time-dispersed signal was received and a matched filter impulse response of the second receiver branch;
    (e) generating a first aligned signal by coherently re-aligning the first time-dispersed digital signal to the reference sequence by using at least the first correlation signal;
    (f) generating a second aligned signal by coherently re-aligning the second time-dispersed digital signal to the reference sequence by using at least the second correlation signal; and
    (g) generating a digital output signal by:
        (i) sampling symbols from each of the aligned signals;
        (ii) generating an array of symbol samples through bit by bit selection of appropriate symbol samples from at least one of the aligned signals based on absolute values of at least one symbol sample from each aligned signal;
        (iii) counting the number of symbol samples selected from each aligned signal; and
        (iv) providing a sequence estimator with the symbol sample array and the s-parameters associated with the receiver branch whose aligned signal which was derived from a time-dispersed signal received by the receiver branch having a desired number of counted symbol samples.

27. The method of claim 26 wherein generating first and second aligned signals comprises passing the first and second received time-dispersed signals through a matched filter.

* * * * *